US008682658B2

(12) United States Patent
Vitte et al.

(10) Patent No.: US 8,682,658 B2
(45) Date of Patent: Mar. 25, 2014

(54) AUDIO EQUIPMENT INCLUDING MEANS FOR DE-NOISING A SPEECH SIGNAL BY FRACTIONAL DELAY FILTERING, IN PARTICULAR FOR A "HANDS-FREE" TELEPHONY SYSTEM

(75) Inventors: Guillaume Vitte, Paris (FR); Michael Herve, Paris (FR)

(73) Assignee: Parrot, Paris (FR)

( * ) Notice: Subject to any disclaimer, the term of this patent is extended or adjusted under 35 U.S.C. 154(b) by 172 days.

(21) Appl. No.: 13/475,431

(22) Filed: May 18, 2012

(65) Prior Publication Data

US 2012/0310637 A1 Dec. 6, 2012

(30) Foreign Application Priority Data

Jun. 1, 2011 (FR) ..................................... 11 54825

(51) Int. Cl.

*G10L 21/02* (2013.01)
*G10L 19/02* (2013.01)
*G10L 19/14* (2006.01)
*G10L 15/20* (2006.01)

(52) U.S. Cl.

USPC ........... 704/226; 704/205; 704/203; 704/204; 704/211; 704/233

(58) Field of Classification Search

USPC ......... 704/226, 205, 203, 204, 211, 233, 262, 704/263

See application file for complete search history.

(56) References Cited

U.S. PATENT DOCUMENTS 4,672,665 A * 6/1987 Nagai et al. .............. 379/406.11
5,574,824 A * 11/1996 Slyh et al. ..................... 704/226
5,761,318 A * 6/1998 Shimauchi et al. ............. 381/66
5,774,562 A * 6/1998 Furuya et al. ................... 381/66
6,289,309 B1 * 9/2001 deVries ......................... 704/233
6,453,285 B1 * 9/2002 Anderson et al. ............. 704/210
6,707,910 B1 * 3/2004 Valve et al. .............. 379/388.06
6,937,980 B2 * 8/2005 Krasny et al. ................. 704/231
7,062,049 B1 * 6/2006 Inoue et al. .................. 381/71.4
7,072,831 B1 * 7/2006 Etter ............................. 704/226
7,117,145 B1 * 10/2006 Venkatesh et al. ............ 704/200
7,533,015 B2 * 5/2009 Takiguchi et al. ............ 704/205
7,533,017 B2 * 5/2009 Gotanda et al. ............... 704/226

(Continued)

OTHER PUBLICATIONS

Djendi, Mohamed et al., "Noise Cancellation Using Two Closely Spaced Microphones: Experimental Study with a Specific Model and Two Adaptive Algorithms", Acoustic, Speech, and Signal Processing, International Conference on Toulouse, France May 14-19, 2006, xp031386771, ISBN: 978-1-4244-0469-8.

*Primary Examiner* — Edgar Guerra-Erazo

(74) *Attorney, Agent, or Firm* — Haverstock & Owens LLP

(57) ABSTRACT

The equipment comprises two microphones, sampling means, and de-noising means. The de-noising means are non-frequency noise reduction means comprising a combiner having an adaptive filter performing an iterative search seeking to cancel the noise picked up by one of the microphones on the basis of a noise reference given by the other microphone sensor. The adaptive filter is a fractional delay filter modeling a delay that is shorter than the sampling period. The equipment also has voice activity detector means delivering a signal representative of the presence or the absence of speech from the user of the equipment. The adaptive filter receives this signal as input so as to enable it to act selectively: i) either to perform an adaptive search for the parameters of the filter in the absence of speech; ii) or else to "freeze" those parameters of the filter in the presence of speech.

8 Claims, 4 Drawing Sheets

(56) References Cited

U.S. PATENT DOCUMENTS

| | | | | |
|---|---|---|---|---|
| 7,562,013 | B2 * | 7/2009 | Gotanda et al. | 704/228 |
| 7,953,596 | B2 * | 5/2011 | Pinto | 704/233 |
| 8,073,689 | B2 * | 12/2011 | Hetherington et al. | 704/233 |
| 2003/0040908 | A1 * | 2/2003 | Yang et al. | 704/233 |
| 2003/0076947 | A1 * | 4/2003 | Furuta et al. | 379/406.01 |
| 2003/0206640 | A1 * | 11/2003 | Malvar et al. | 381/93 |
| 2005/0114128 | A1 * | 5/2005 | Hetherington et al. | 704/233 |
| 2005/0171785 | A1 * | 8/2005 | Nomura et al. | 704/500 |
| 2006/0210089 | A1 * | 9/2006 | Tashev et al. | 381/66 |
| 2007/0055511 | A1 * | 3/2007 | Gotanda et al. | 704/233 |
| 2007/0100615 | A1 * | 5/2007 | Gotanda et al. | 704/226 |
| 2007/0165879 | A1 | 7/2007 | Deng et al. | |
| 2007/0276660 | A1 * | 11/2007 | Pinto | 704/219 |
| 2008/0280653 | A1 | 11/2008 | Ma et al. | |
| 2009/0164212 | A1 * | 6/2009 | Chan et al. | 704/226 |
| 2009/0310796 | A1 * | 12/2009 | Seydoux | 381/71.1 |
| 2010/0017206 | A1 * | 1/2010 | Kim et al. | 704/233 |

* cited by examiner

AUDIO EQUIPMENT INCLUDING MEANS FOR DE-NOISING A SPEECH SIGNAL BY FRACTIONAL DELAY FILTERING, IN PARTICULAR FOR A "HANDS-FREE" TELEPHONY SYSTEM

FIELD OF THE INVENTION

The invention relates to processing speech in a noisy environment.

The invention relates in particular to processing speech signals picked up by telephony devices of the "hands-free" type for use in a noisy environment.

BACKGROUND OF THE INVENTION

These appliances have one or more sensitive microphones that pick up not only the user's voice but also the surrounding noise, which noise constitutes a disturbing element that, under certain circumstances, may go so far as to make the speaker's speech unintelligible. The same applies if it is desired to implement voice recognition techniques, since it is very difficult to perform shape recognition on words buried in a high level of noise.

This difficulty associated with surrounding noise is particularly constraining for "hands-free" devices in motor vehicles, regardless of whether the devices comprise equipment incorporated in the vehicle or accessories in the form of a removable unit incorporating all of the components and functions for processing the signal for telephone communication.

The large distance between the microphone (placed on the dashboard or in a top corner of the ceiling of the cabin) and the speaker (whose position is determined by the driving position) means that a relatively high level of noise is picked up, thereby making it difficult to extract the useful signal that is buried in the noise. Furthermore, the very noisy surroundings typical of the car environment present spectral characteristics that are not steady, i.e. that vary in unpredictable manner as a function of driving conditions: passing over a bumpy road or cobblestones, car radio in operation, etc.

Difficulties of the same kind occur when the device is an audio headset of the combined microphone and earphone type used for communication functions such as "hands-free" telephony functions, in addition to listening to an audio source (e.g. music) coming from an appliance to which the headset is connected.

Under such circumstances, it is important to ensure sufficient intelligibility of the signal as picked up by the microphone, i.e. the speech signal from the near speaker (the wearer of the headset). Unfortunately, the headset may be used in an environment that is noisy (metro, busy street, train, etc.), such that the microphone picks up not only the speech of the wearer of the headset, but also surrounding interfering noise. The wearer is indeed protected from the noise by the headset, particularly if it is a model having closed earpieces that isolate the ears from the outside, and even more so if the headset is provided with "active noise control". In contrast, the remote speaker (the speaker at the other end of the communication channel) will suffer from the interfering noise picked up by the microphone and that becomes superposed on and interferes with the speech signal from the near speaker (the wearer of the headset). In particular, certain speech formants that are essential for understanding voice are often buried in noise components that are commonly encountered in everyday environments.

The invention relates more particularly to de-noising techniques that implement a plurality of microphones, generally two microphones, in order to combine the signals picked up simultaneously by both microphones in an appropriate manner for isolating the useful speech components from the interfering noise components.

A conventional technique consists in placing and pointing one of the microphones so that it picks up mainly the speaker's voice, while the other microphone is arranged so as to pick up a noise component that is greater than that which is picked up by the main microphone. Comparing the signals as picked up then enables the voice to be extracted from the surrounding noise by analyzing the spatial consistency between the two signals, using software means that are relatively simple.

US 2008/0280653 A1 describes one such configuration, in which one of the microphones (the microphone that mainly picks up the voice) is the microphone of a wireless earpiece worn by the driver of the vehicle, while the other microphone (the microphone that picks up mainly noise) is the microphone of the telephone appliance, that is placed remotely in the vehicle cabin, e.g. attached to the dashboard.

Nevertheless, that technique presents the drawback of requiring two microphones that are spaced apart from each other, with its effectiveness increasing with increasing distance between the microphones. As a result, that technique is not applicable to a device in which the two microphones are close together, e.g. two microphones incorporated in the front of a car radio of a motor vehicle, or two microphones arranged on one of the shells of an earpiece of an audio headset.

Another technique, known as "beamforming", consists in using software means to create directivity that serves to improve the signal-to-noise ratio of the microphone array or "antenna". US 2007/0165879 A1 describes one such technique, applied to a pair of non-directional microphones placed back to back. Adaptive filtering of the signals they pick up enables an output signal to be derived in which the voice component is reinforced.

Nevertheless, it is found that such a method provides good results only on condition of having an array of at least eight microphones, with performance being extremely limited when only two microphones are used.

OBJECT AND SUMMARY OF THE INVENTION

In such a context, the general problem of the invention is that of reducing noise effectively so as to deliver a voice signal to the remote speaker that is representative of the speech uttered by the near speaker (the driver of the vehicle or the wearer of the headset), by removing from said signal the interfering components of external noise present in the environment of the near speaker.

In such a situation, the problem of the invention is also to be able to make use of a set of microphones in which both the number of microphones is small (advantageously only two) and the microphones are also relatively close together (typically spaced apart by only a few centimeters).

Another important aspect of the problem is the need to play back a speech signal that is natural and intelligible, i.e. that is not distorted and in which the useful frequency spectrum is not removed by the de-noising processing.

To this end, the invention proposes audio equipment of the general type disclosed in above-mentioned US 2008/0280653 A1, i.e. comprising: a set of two microphone sensors suitable for picking up the speech of the user of the equipment and for delivering respective noisy speech signals; sampling means for sampling the speech signals delivered by the microphone sensors; and de-noising means for de-noising a speech signal, the de-noising means receiving as input the samples of the speech signals delivered by the two microphone sensors and delivering as output a de-noised speech signal representative of the speech uttered by the user of the equipment. The de-noising means are non-frequency noise reduction means comprising an adaptive filter combiner for combining the signals delivered by the two microphone sensors, operating by iterative searching seeking to cancel the noise picked up by one of the microphone sensors on the basis of a noise reference given by the signal delivered by the other microphone sensor.

In accordance with the invention, the adaptive filter is a fractional delay filter suitable for modeling a delay shorter than the sampling period of the sampling means. The equipment further includes voice activity detector means suitable for delivering a signal representative of the presence or the absence of speech from the user of the equipment, and the adaptive filter also receives as input the speech present or absent signal so as to act selectively: i) either to perform an adaptive search for filter parameters in the absence of speech; ii) or else to "freeze" those parameters of the filter in the presence of speech.

The adaptive filter is suitable in particular for estimating an optimum filter H such that:

$$\hat{H}=\hat{G}\otimes\hat{F}$$

where:

$$x'(n)=G\otimes x(n) \text{ and } G(k)=\sin c(k+\tau/Te),$$

$\hat{H}$ representing the estimated optimum filter H for transferring noise between the two microphone sensors for an impulse response that includes a fractional delay;

$\hat{G}$ representing the estimated fractional delay filter G between the two microphone sensors;

$\hat{F}$ representing the estimated acoustic response of the environment;

$\otimes$ representing convolution;

x(n) being the series of samples of the signal input to the filter H;

x' (n) being the series x(n) as offset by a delay $\tau$;

Te being the sampling period of the signal input to the filter H;

$\tau$ being said fractional delay, equal to a submultiple of Te; and sin c representing the cardinal sine function.

Preferably, the adaptive filter is a filter having a linear prediction algorithm of the least mean square (LMS) type.

In one embodiment, the equipment includes a video camera pointing towards the user of the equipment and suitable for picking up an image of the user; and the voice activity detector means comprise video analysis means suitable for analyzing the signal produced by the camera and for delivering in response said signal representing the presence or the absence of speech from said user.

In another embodiment, the equipment includes a physiological sensor suitable for coming into contact with the head of the user of the equipment so as to be coupled thereto in order to pick up non-acoustic vocal vibration transmitted by internal bone conduction; and the voice activity detector means comprise means suitable for analyzing the signal delivered by the physiological sensor and for delivering in response said signal representative of the presence or the absence of speech by said user, in particular by evaluating the energy of the signal delivered by the physiological sensor and comparing it with a threshold.

In particular, the equipment may be an audio headset of the combined microphone and earphone type, the headset comprising: earpieces each comprising a transducer for reproducing sound of an audio signal and housed in a shell provided with an ear-surrounding cushion; said two microphone sensors disposed on the shell of one of the earpieces; and said physiological sensor incorporated in the cushion of one of the earpieces and placed in a region thereof that is suitable for coming into contact with the cheek or the temple of the wearer of the headset. These two microphone sensors are preferably in alignment as a linear array on a main direction pointing towards the mouth of the user of the equipment.

BRIEF DESCRIPTION OF THE DRAWINGS

There follows a description of an embodiment of the device of the invention with reference to the accompanying drawings in which the same numerical references are used from one figure to another to designate elements that are identical or functionally similar.

MORE DETAILED DESCRIPTION

Figure 1:
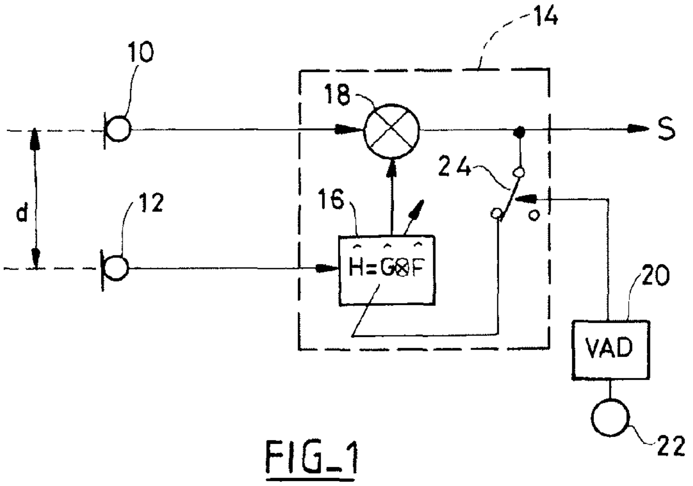
FIG. 1 is a block diagram showing the way in which the de-noising processing of the invention is performed.

FIG. 1 is a block diagram showing the various functions implemented by the invention.

The process of the invention is implemented by software means, represented by various functional blocks corresponding to appropriate algorithms executed by a microcontroller or a digital signal processor. Although for clarity of explanation the various functions are shown in the form of distinct modules, they make use of elements in common and in practice they correspond to a plurality of functions performed overall by a single piece of software.

The signal that it is desired to de-noise comes from an array of microphone sensors that, in the minimum configuration shown, may comprise merely an array of two sensors arranged in a predetermined configuration, each sensor being constituted by a corresponding respective microphone 10, 12.

Nevertheless, the invention may be generalized to an array of more than two microphone sensors, and/or to microphone sensors in which each sensor is constituted by a structure that is more complex than a single microphone, for example a combination of a plurality of microphones and/or of other speech sensors.

The microphones 10, 12 are microphones that pick up the signal emitted by the useful signal source (the speech signal from the speaker), and the difference in position between the two microphones gives rise to a set of phase offsets and amplitude variations in the signals as picked up from the useful signal source.

In practice, both microphones 10 and 12 are omnidirectional microphones spaced apart from each other by a few centimeters on the ceiling of a car cabin, on the front plate of a car radio, or at an appropriate location on the dashboard, or indeed on the shell of one of the earpieces of an audio headset, etc.

As explained below, the technique of the invention makes it possible to provide effective de-noising even with microphones that are very close together, i.e. when they are spaced apart from each other by a spacing d such that the maximum phase delay of a signal picked up by one microphone and then by the other is less than the sampling period of the converter used for digitizing the signals. This corresponds to a maximum distance d of the order of 4.7 centimeters (cm) when the sampling frequency $F_e$ is 8 kilohertz (kHz) (and to a spacing d of half that when sampling at twice the frequency, etc.).

A speech signal uttered by a near speaker will reach one of the microphones before the other, and will therefore present a delay and thus a phase shift $\phi$, that is substantially constant. For noise, it is indeed possible for there also to be a phase shift between the two microphones 10 and 12. In contrast, since the notion of a phase shift is associated with the notion of the direction in which the incident wave is traveling, it may be expected that the phase shift of noise will be different from that of speech. For example, if directional noise is traveling in the opposite direction to the direction from the mouth, its phase shift will be $-\phi$ if the phase shift for voice is $\phi$.

In the invention, noise reduction on the signals picked up by the microphones 10 and 12 is not performed in the frequency domain (as is often the case in conventional de-noising techniques), but rather in the time domain.

This noise reduction is performed by means of an algorithm that searches for the transfer function between one of the microphones (e.g. the microphone 10) and the other microphone (i.e. the microphone 12) by means of an adaptive combiner 14 that implements a predictive filter 16 of the LMS type. The output from the filter 16 is subtracted at 18 from the signal from the microphone 10 in order to give a de-noised signal S that is applied in return to the filter 16 in order to enable it to adapt iteratively as a function of its prediction error. It is thus possible to use the signal picked up by the microphone 12 to predict the noise component contained in the signal picked up by the microphone 10 (the transfer function identifying the transfer of noise).

The adaptive search for the transfer function between the two microphones is performed only during stages when speech is absent. For this purpose, the iterative adaptation of the filter 16 is activated only when a voice activation detector (VAD) 20 under the control of a sensor 22 indicates that the near speaker is not speaking. This function is represented by the switch 24: in the absence of a speech signal confirmed by the voice activity detector 20, the adaptive combiner 14 seeks to optimize the transfer function between the two microphones 10 and 12 so as to reduce the noise component (the switch 24 is in the closed position, as shown in the figure); in contrast, in the presence of a speech signal confirmed by the voice activity detector 20, the adaptive combiner 14 "freezes" the parameters of the filter 16 at the values they had immediately before speech was detected (opening the switch 24), thereby avoiding any degradation of the speech signal from the near speaker.

It should be observed that proceeding in this way is not troublesome, even in the presence of a noisy environment that is varying, since the updates of the parameters of the filter 16 are very frequent, given that they take place each time the near speaker stops speaking.

In accordance with the invention, the filtering of the adaptive combiner 14 is fractional delay filtering, i.e. it serves to apply filtering between the signals picked up by the two microphones while taking account of a delay that is shorter than the duration of a digitizing sample of the signal.

It is known that a time-varying signal x(t) of passband [0,Fe/2] may be reconstituted perfectly from a discrete series x(k) in which the samples x(k) correspond to the values of x(t) at instants k·Te (where Te=1/Fe is the sampling period).

The mathematical expression is as follows:

$$x(t) = \sum_k x(k).\mathrm{sinc}\left(\frac{t - k.Te}{Te}\right)$$

The cardinal sine function sin c is defined as follows:

$$\mathrm{sinc}(t) = \frac{\sin(pi * t)}{pi * t}$$

Figure 2:
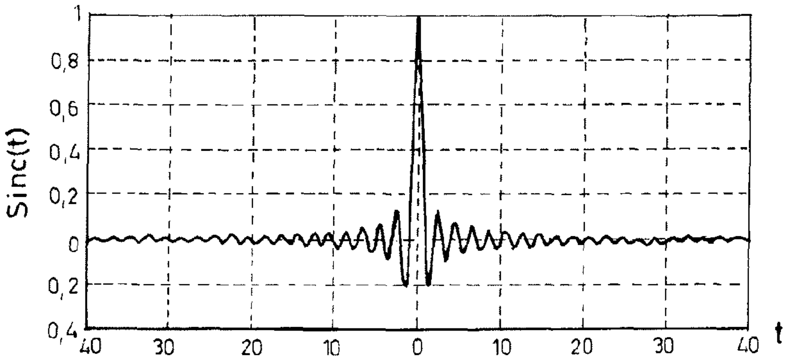
FIG. 2 is a graph showing the cardinal sine function modeled in the de-noising processing of the invention.

FIG. 2 is a graphical representation of this function sin c(t).

As can be seen, this function decreases rapidly, with the consequence that a finite and relatively small number of coefficients k in the sum gives a very good approximation of the real result.

For a signal digitized at a sampling period Te, the time interval or offset between two samples corresponds in time to a duration of Te seconds (s).

The series x(n) of n successive digitized samples of the signal as picked up may thus be represented by the following expression for all integer n:

$$x(n.Te) = \sum_k x(k).\mathrm{sinc}\left(\frac{n.Te - k.Te}{Te}\right)$$

It should be observed that the sin c term is zero for all k other than k=n.

Figure 3A:
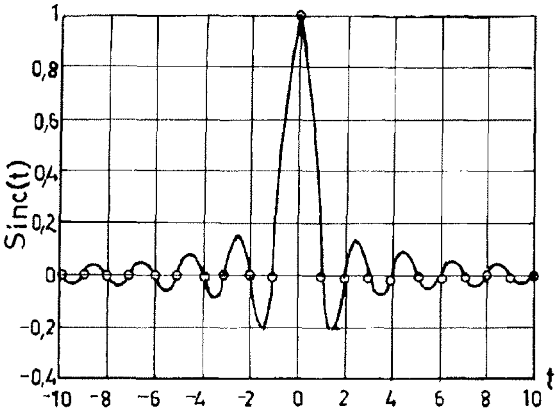
FIGS. 3*a* and 3*b* show the FIG. 2 cardinal sine function respectively for the various points of a series of signal samples, and for the same series offset in time by a fractional value.

FIG. 3*a* gives a graphical representation of this function.

If it is desired to calculate the same series x(n) offset by a fractional value $\tau$, i.e. by a delay that is shorter than that duration of one digitizing sample Te, the above expression becomes:

$$x(n.Te - \tau) = \sum_k x(k).\mathrm{sinc}\left(\frac{(n-k).Te - \tau}{Te}\right)$$

Figure 3B:
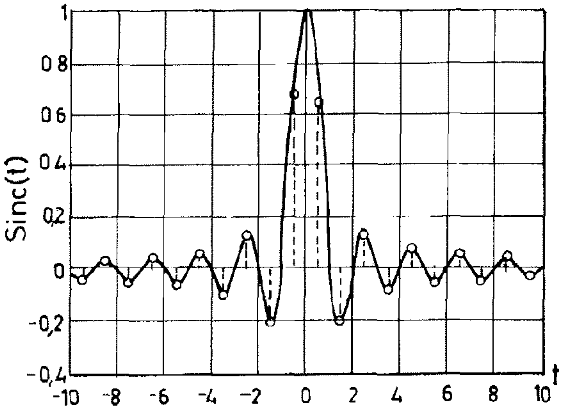

FIG. 3*b* gives a graphical representation of this function, for a fractional value example of $\tau$=0.5 (one half sample).

The series x'(n) (the series offset by τ) may be seen as being the convolution of x(n) by a non-causal filter G such that:

$$x'(n)=G\otimes x(n)$$

It is thus necessary to determine an estimate G of an optimum filter G such that:

$$\hat{H}=\hat{G}\otimes\hat{F} \text{ and } G(k)=\sin c(k+\tau/Te),$$

Ĥ being the estimate for the transfer of noise between the two microphones, including a fractional delay; and F̂ being the estimate of the acoustic response of the surroundings.

In order to estimate the noise transfer filter between the two microphones, the estimate Ĥ corresponds to a filter that minimizes the following error:

$$e(n)=\text{MicFront}(n)-\hat{H}*\text{MicBack}(n)$$

MicFront(n) and MicBack(n) being the respective values of the signals from the microphone sensors 10 and 12.

This filter has the characteristic of being non-causal, i.e. it makes use of future samples. In practice, this means that a time delay is introduced in the time for performing algorithmic processing. Since the filter is non-causal, it is capable of modeling a fractional delay and may thus be written Ĥ=Ĝ⊗F̂ (whereas in the conventional situation of a causal filter, the equation would be Ĥ=F̂).

Specifically, in the algorithm, Ĥ is estimated directly, by minimizing the above error e(n), without there being any need to estimate Ĝ and F̂ separately.

In the conventional causal situation (e.g. for an echo-canceller filter), the error e(n) for minimizing is written in the developed form as follows:

$$e(n) = MicFront(n) - \sum_{k=0}^{L-1} \hat{H}(k).MicBack(n-k)$$

where L is the length of the filter.

In the situation of the present invention (non-causal filter), the error becomes:

$$e(n) = MicFront(n) - \sum_{k=-L}^{L-1} \hat{H}(k).MicBack(n-k)$$

It should be observed that the length of the filter is doubled in order to take future samples into account.

The prediction of the filter H gives a fractional delay filter that, ideally and in the absence of speech, cancels the noise from the microphone 10 using the microphone 12 as its reference (as mentioned above, during a period of speech, the filter is "frozen" in order to avoid any degradation of the local speech).

Specifically, the filter Ĥ calculated by the adaptive algorithm that estimates the transfer of noise between the microphone 10 and the microphone 12 may be considered as the convolution Ĥ=Ĝ⊗F̂ of two filters Ĝ and F̂ where:

- Ĝ corresponds to the fractional portion (with the cardinal sine waveform); and
- F̂ corresponds to the acoustic transfer between the two microphones, i.e. to the "environmental" portion of the system, representing the acoustics of the surroundings in which the filter is operating.

Figure 4:
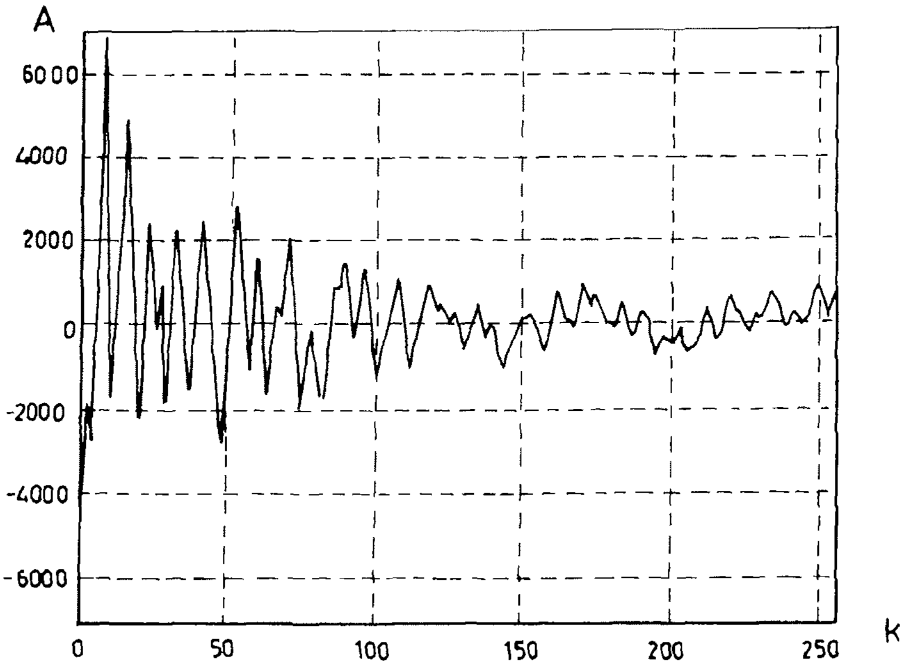
FIG. 4 shows the acoustic response of the surroundings, with amplitude plotted up the ordinate axis and the coefficients of the filter representing this transfer plotted along the abscissa axis.

FIG. 4 shows an example of the acoustic response between the two microphones in the form of a characteristic giving the amplitude A as a function of the coefficients k of the filter F. The various reflections of the sound that can occur as a function of the surroundings, e.g. on the windows or other walls of a car cabin, give rise to the peaks that can be seen in this acoustic response characteristic.

Figure 5:
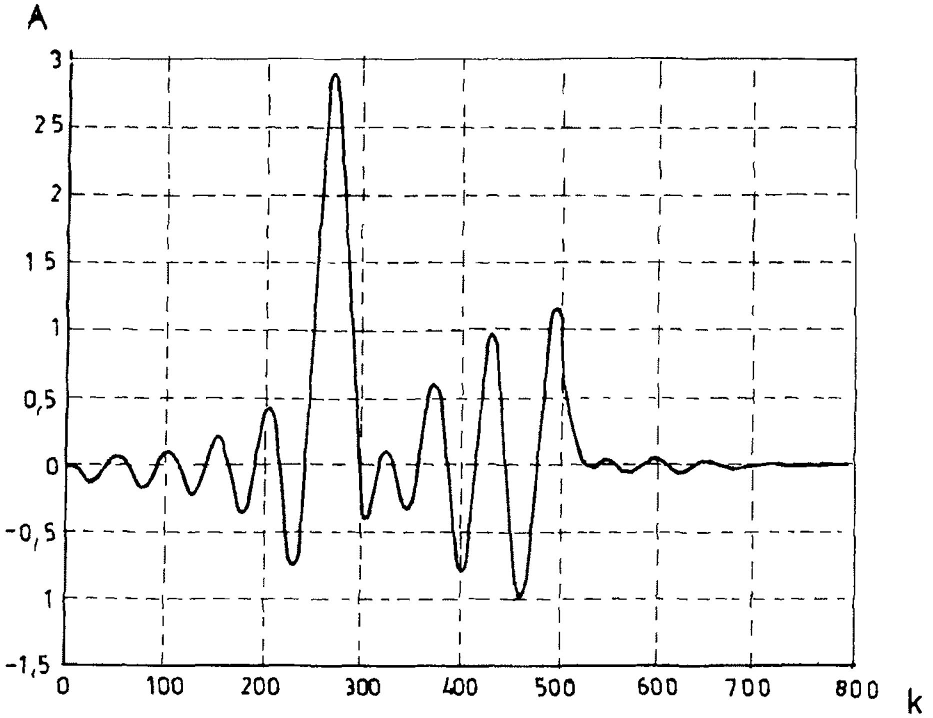
FIG. 5 corresponds to FIG. 4 after convolution with a cardinal sine response.

FIG. 5 shows an example of the result of the convolution G ⊗ F of the two filters G (cardinal sine response) and F (utilization environment) in the form of a characteristic giving the amplitude A as a function of the coefficients k of the convolutive filter.

The estimate Ĥ may be calculated by an iterative LMS algorithm seeking to minimize the error y(n)−Ĥ⊗ x(n) in order to converge on the optimum filter.

Filters of the LMS type—or of the normalized LMS (NLMS) type, which is a normalized version of the LMS type—are algorithms that are relatively simple and that do not require large amounts of calculation resources. These algorithms are themselves known, e.g. as described in:

[1] B. Widrow, *Adaptive Filters*, Aspect of Network and System Theory, R. E. Kalman and N. De Claris Eds., New York: Holt, Rinehart and Winston, pp. 563-587, 1970;

[2] B. Widrow et al., *Adaptive Noise Cancelling: Principles and Applications*, Proc. IEEE, Vol. 63, No. 12 pp. 1692-1716, December 1975;

[3] B. Widrow and S. Stearns, *Adaptive Signal Processing*, Prentice-Hall Signal Processing Series, Alan V. Oppenheim Series Editor, 1985.

As mentioned above, in order for the above processing to be possible, it is necessary to have a voice activity detector that makes it possible to discriminate between stages in which speech is absent (during which adapting the filter serves to optimize noise evaluation), and stages in which speech is present (periods during which the parameters of the filter are "frozen" on their most recently-found value).

More precisely, in this example, the voice activity detector is preferably a "perfect" detector, i.e. it delivers a binary signal (speech absent or present). It thus differs from most voice activity detectors as used in known de-noising systems, since they deliver only a probability of speech being present, which probably varies between 0 and 100% either continuously or in successive steps. With such detectors based only on a probability of speech being present, false detections can be significant in noisy environments.

In order to be "perfect", the voice activity detector cannot rely solely on the signal picked up by the microphones; it must have additional information enabling it to distinguish between stages of speech and stages in which the near speaker is silent.

Figure 6:
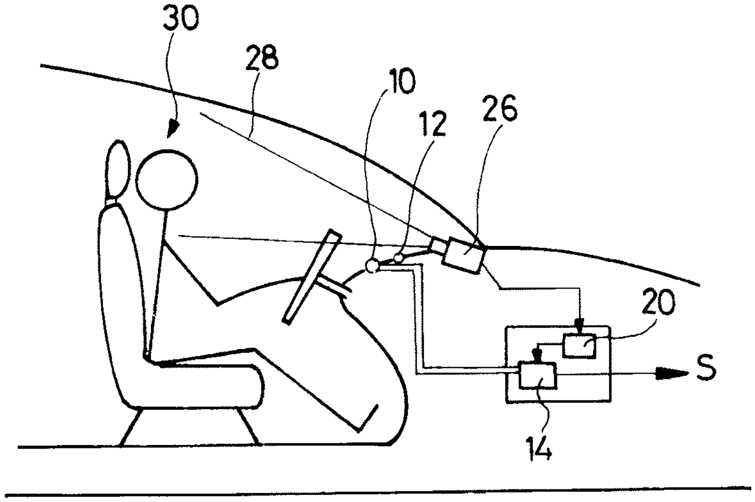
FIG. 6 is a diagram showing an embodiment consisting in using a camera for detecting voice activity.

A first example of such a detector is shown in FIG. 6, where the voice activity detector 20 operates in response to a signal produced by a camera.

By way of example, the camera is a camera 26 installed in the cabin of a motor vehicle, and pointed so that, under all circumstances, its field of view 28 covers the head 30 of the driver, who is considered as being the near speaker. The signal delivered by the camera 26 is analyzed in order to determine whether or not the speaker is speaking on the basis of movements of the mouth and the lips.

For this purpose, it is possible to use algorithms for detecting the mouth region in an image of a face, and an algorithm for lip contour tracking, such as those described in particular in:

[4] G. Potamianos et al., *Audio-Visual Automatic Speech Recognition: An Overview*, Audio-Visual Speech Processing, G. Bailly et al. Eds., MIT Press, pp. 1-30, 2004.

In general manner, that document describes the contribution of visual information in addition to an audio signal, in particular for the purpose of recognizing voice in degraded acoustic conditions. The video data is thus additional to conventional audio data in order to improve voice information (speech enhancement).

Such processing may be used in the context of the present invention in order to distinguish between stages during which the speaker is speaking and stages in which the speaker is silent. In order to take account of the fact that the movements of the user in a car cabin are slow whereas the movements of the mouth are fast, it is possible for example, once focused on the mouth, to compare two consecutive images and to evaluate the shift on a given pixel.

The advantage of that image analysis technique is that it provides additional information that is completely independent of the acoustic noise environment.

Another example of a sensor suitable for "perfect" detection of voice activity is a physiological sensor suitable for detecting certain vocal vibrations of the speaker that are corrupted little if at all by the surrounding noise.

Such a sensor may be constituted in particular by an accelerometer or a piezoelectric sensor applied against the cheek or the temple of the speaker.

When a person is uttering a voiced sound (i.e. a speech component for which production is accompanied by vibration of the vocal cords), vibration propagates from the vocal cords to the pharynx and the oronasal cavity, in which it is modulated, amplified, and articulated. The mouth, the soft palate, the pharynx, the sinuses, and the nasal cavity then serve as a resonator for this voiced sound and, since their walls are elastic, they vibrate in turn and those vibrations are transmitted by internal bone conduction and can be perceived via the cheek and the temple.

These vibrations of the cheek and the temple present, by their very nature, the characteristic of being corrupted very little by surrounding noise: in the presence of external noise, even very loud noise, the tissues of the cheek and the temple hardly vibrate at all, and this applies regardless of the spectral composition of the external noise.

A physiological sensor that picks up these voice vibrations free from noise gives a signal that is representative of the presence or the absence of voiced sounds uttered by the speaker, thus providing very good discrimination between stages of speech and stages when the speaker is silent.

Figure 7:
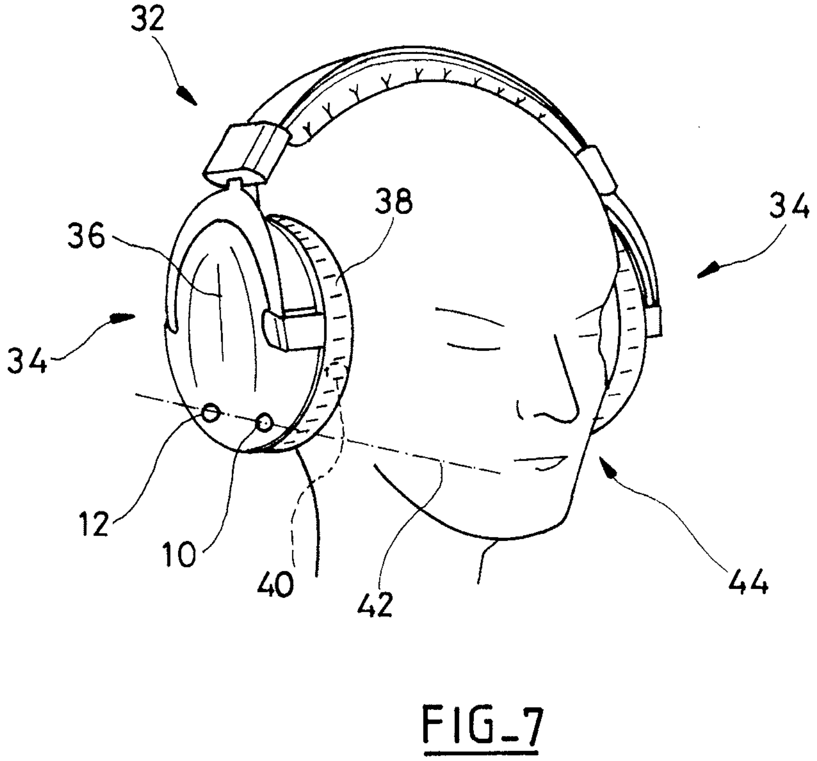
FIG. 7 is an overall view of a combined microphone and earphone headset unit to which the teaching of the invention can be applied.

Such a physiological sensor may be incorporated in particular in a combined microphone and earphone headset unit of the kind shown in FIG. 7.

In this figure, reference 32 is an overall reference for the headset of the invention, which comprises two earpieces 34 united by a headband. Each of the earpieces is preferably constituted by a closed shell 36 housing a sound reproduction transducer and pressed around the user's ear with an interposed cushion 38 that isolates the ear from the outside.

The physiological sensor 40 used for detecting voice activity may for example be an accelerometer that is incorporated in the cushion 38 in such a manner as to press against the user's cheek or temple with coupling that is as close as possible. The physiological sensor 40 may in particular be placed on the inside face of the skin of the cushion 38 such that once the headset is in place, the sensor is pressed against the user's cheek or temple under the effect of the small amount of pressure that results from flattening the material of the cushion, with only the outside skin of the cushion being interposed therebetween.

The headset also carries the microphones 10 and 12 of the circuit for picking up and de-noising the speech of the speaker. These two microphones are omnidirectional microphones based on the shell 36 and they are arranged with the microphone 10 placed in front (closer to the mouth of the wearer of the headset) and the microphone 12 placed further back. Furthermore, the direction 42 in which the two microphones 10 and 12 are aligned points approximately towards the mouth 44 of the wearer of the headset.

Figure 8:
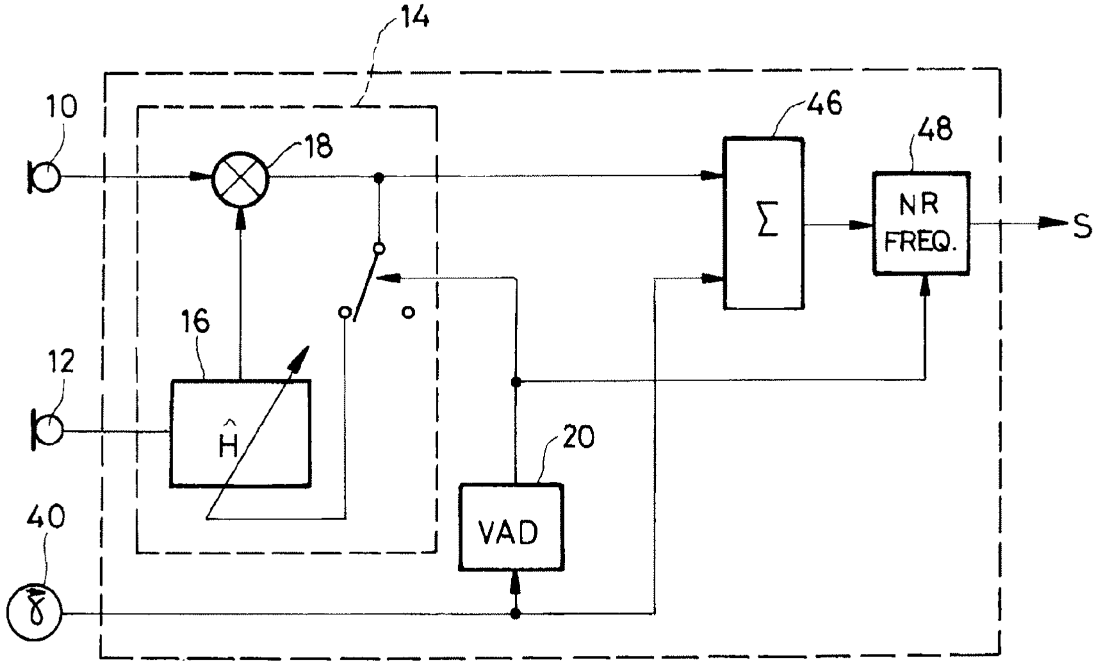
FIG. 8 is an overall block diagram showing how the signal processing can be implemented for the purpose of outputting a de-noised signal representative of the speech uttered by the wearer of the FIG. 7 headset.

FIG. 8 is a block diagram showing the various functions implemented by the microphone and headset unit of FIG. 7.

This figure shows the two microphones 10 and 12 together with the voice activity detector 20. The front microphone 10 is the main microphone and the back microphone 12 provides input to the adaptive filter 16 of the combiner 14. The voice activity detector 20 is controlled by the signal delivered by the physiological sensor 40, e.g. with smoothing of the power of the signal delivered by said sensor 40:

$$power_{sensor}(n)=\alpha\cdot power_{sensor}(n-1)+(1-\alpha)\cdot(sensor(n))^2$$

α being a smooth constant close to 1. It then suffices to set a threshold ξ such that the threshold is exceeded as soon as the speaker starts speaking.

Figure 9:
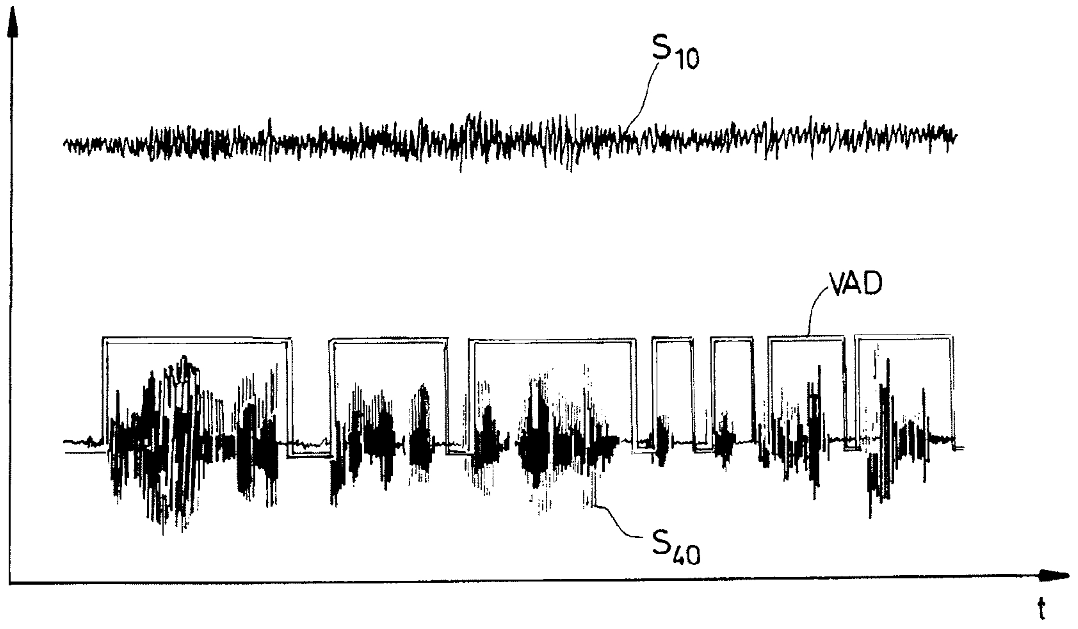
FIG. 9 shows two timing diagrams corresponding respectively to an example of the raw signal picked up by the microphones, and of the signal picked up by the physiological sensor serving to distinguish between periods of speech and periods when the speaker is silent.

FIG. 9 shows the appearance of the signals that are picked up:

- the signal $S_{10}$ of the upper timing diagram corresponds to the signal picked up by the front microphone 10: it can be seen that it is not possible on the basis of this (noisy) signal to discriminate effectively between stages when speech is present and when speech is absent; and
- the signal $S_{40}$ of the lower timing diagram corresponds to the signal delivered simultaneously by the physiological sensor 40: the successive stages during which speech is present and absent are marked therein much more clearly. The binary signal referenced VAD corresponds to the indication delivered by the voice activity detector 20 ('1'=speech present; '0'=speech absent), after evaluating the power of the signal $S_{40}$ and comparing it relative to the predefined threshold ξ.

The signal delivered by the physiological sensor 40 may be used not only as an input signal to the voice activity detector, but also as a signal for enriching the signal picked up by the microphones 10 and 12, in particular in the low frequency region of the spectrum.

Naturally, the signals delivered by the physiological sensor, which correspond to voiced sounds, are not properly speaking speech since speech is made up not only of voiced sounds, but also contains components that do not stem from the vocal cords: the frequency content may for example may be much richer with the sound coming from the throat and issuing from the mouth. Furthermore, internal bone conduction and passage through the skin has the effect of filtering out certain voice components.

In addition, because of the filtering due to vibration propagating all the way to the temple or the cheek, the signal picked up by the physiological sensor is suitable for use only at low frequencies, mainly in the low region of the sound spectrum (typically 0 to 1500 hertz (Hz)).

However, since the noise that is generally encountered in everyday surroundings (street, metro, train, . . . ) is concentrated mainly at low frequencies, the signal from a physiological sensor presents the significant advantage of naturally being free from any parasitic noise component, so it is possible to make use of this signal in the low region of the spectrum, while associating it in the high region of the spectrum (above 1500 Hz) with the (noisy) signals picked up by the microphones 10 and 12, after subjecting those signals to noise reduction performed by the adaptive combiner 14.

The complete spectrum is reconstructed by means of the mixer block 46 that receives in parallel: the signal from the physiological sensor 40 for the low region of the spectrum;

and the signals from the microphones 10 and 12 after de-noising by the adaptive combiner 14 for the high region of the spectrum. This reconstruction is performed by summing signals, which signals are applied synchronously to the mixer block 46 so as to avoid any deformation.

The resultant signal delivered by the block 46 may be subjected to final noise reduction by the circuit 48, with this noise reduction being performed in the frequency domain using a conventional technique comparable to that described for example in WO 2007/099222 A1 (Parrot) in order to output the final de-noised signal S.

The implementation of that technique is nevertheless greatly simplified compared with the teaching in the above-mentioned document, for example. In the present circumstances, there is no longer any need to evaluate a probability of speech being present on the basis of the signal as picked up, since this information may be obtained directly from the voice activity detector block 20 in response to detecting the emission of voiced sound as performed by the physiological sensor 40. The algorithm can thus be simplified and made more effective and faster.

Frequency noise reduction is advantageously performed differently in the presence of speech and in the absence of speech (information given by the perfect voice activity detector 20):

- in the absence of speech, noise reduction is maximized in all frequency bands, i.e. the gain corresponding to maximum de-noising is applied in the same manner to all of the components of the signal (since it is certain under such circumstances that none of them contains any useful component); and
- in contrast, in the presence of speech, noise reduction is frequency reduction applied differently to each frequency band in the conventional manner.

The above-described system makes it possible to obtain excellent overall performance, with noise reduction typically being of the order of 30 decibels (dB) to 40 dB on the speech signal from the near speaker. Since the adaptive combiner 14 operates on the signals picked up by the microphones 10 and 12 it serves in particular, with fractional delay filtering, to obtain very good de-noising performance in the high frequency range.

By eliminating all of the interfering noise, the remote speaker (the speaker with whom the wearer of the headset is in communication) is given the impression that the other party (the wearer of the headset) is in a silent room.

What is claimed is:

1. Audio equipment, comprising:

a set of two microphone sensors suitable for picking up the speech of the user of the equipment and for delivering respective noisy speech signals;

sampling means for sampling the speech signals delivered by the microphone sensors; and de-noising means for de-noising a speech signal, the de-noising means receiving as input the samples of the speech signals delivered by the two microphone sensors and delivering as output a de-noised speech signal representative of the speech uttered by the user of the equipment;

wherein:

the de-noising means are non-frequency noise reduction means comprising an adaptive filter combiner for combining the signals delivered by the two microphone sensors, operating by iterative searching seeking to cancel the noise picked up by one of the microphone sensors on the basis of a noise reference given by the signal delivered by the other microphone sensor;

the adaptive filter is a fractional delay filter suitable for modeling a delay shorter than the sampling period of the sampling means;

the equipment further includes voice activity detector means suitable for delivering a signal representative of the presence or the absence of speech from the user of the equipment; and the adaptive filter also receives as input the speech present or absent signal so as to act selectively: i) either to perform an adaptive search for filter parameters in the absence of speech; ii) or else to "freeze" those parameters of the filter in the presence of speech.

2. The audio equipment of claim 1, wherein the adaptive filter is suitable for estimating an optimum filter H such that:

$$\hat{H}=\hat{G}\otimes\hat{F}$$

where:

$$x'(n)=G\otimes x(n) \text{ and } G(k)=\sin c(k+\tau/Te)$$

$\hat{H}$ representing the estimated optimum filter H for transferring noise between the two microphone sensors for an impulse response that includes a fractional delay;

$\hat{G}$ representing the estimated fractional delay filter G between the two microphone sensors;

$\hat{F}$ representing the estimated acoustic response of the environment;

$\otimes$ representing convolution;

x(n) being the series of samples of the signal input to the filter H;

x'(n) being the series x(n) as offset by a delay $\tau$;

Te being the sampling period of the signal input to the filter H;

$\tau$ being said fractional delay, equal to a submultiple of Te; and sin c representing the cardinal sine function.

3. The audio equipment of claim 1, wherein the adaptive filter is a filter having a linear prediction algorithm of the least mean square type.

4. The audio equipment of claim 1, wherein:

the equipment further includes a video camera pointing towards the user of the equipment and suitable for picking up an image of the user; and the voice activity detector means comprise video analysis means suitable for analyzing the signal produced by the camera and for delivering in response said signal representing the presence or the absence of speech from said user.

5. The audio equipment of claim 1, wherein:

the equipment further includes a physiological sensor suitable for coming into contact with the head of the user of the equipment so as to be coupled thereto in order to pick up non-acoustic vocal vibration transmitted by internal bone conduction; and the voice activity detector means comprise means suitable for analyzing the signal delivered by the physiological sensor and for delivering in response said signal representative of the presence or the absence of speech by said user.

6. The audio equipment of claim 5, wherein the voice activity detector means comprise means for evaluating the energy in the signal delivered by the physiological sensor, and threshold means.

7. The audio equipment of claim 6, wherein the equipment is an audio headset of the combined microphone and earphone type, the headset comprising:

earpieces each comprising a transducer for reproducing sound of an audio signal and housed in a shell provided with an ear-surrounding cushion;

said two microphone sensors disposed on the shell of one of the earpieces; and said physiological sensor incorporated in the cushion of one of the earpieces and placed in a region thereof that is suitable for coming into contact with the cheek or the temple of the wearer of the headset.

8. The audio equipment of claim 7, wherein the two microphone sensors are in alignment as a linear array on a main direction pointing towards the mouth of the user of the equipment.

* * * * *